United States Patent [19]

Sauber

[11] Patent Number: 5,215,272
[45] Date of Patent: Jun. 1, 1993

[54] WINDING DEVICE HAVING A TILTING TABLE AND METHOD

[76] Inventor: Charles J. Sauber, 10 N. Sauber Rd., Virgil, Ill. 60182

[21] Appl. No.: 809,103

[22] Filed: Dec. 11, 1991

Related U.S. Application Data

[63] Continuation-in-part of Ser. No. 648,041, Jan. 30, 1991, abandoned.

[51] Int. Cl.⁵ ............... B65H 75/00; B65H 16/00; B66D 1/14; B66D 1/00
[52] U.S. Cl. ............... 242/54 R; 242/86.5 R; 254/294; 254/332
[58] Field of Search ............... 254/279, 284, 281, 294, 254/311, 382, 361, 312, 316, 332, 329; 242/54 R, 155 BW, 158.2, 86.5 R, 86.61, 86.7, 117

[56] References Cited

U.S. PATENT DOCUMENTS

| | | | |
|---|---|---|---|
| 980,220 | 1/1911 | Eastman | 254/175.7 |
| 2,948,483 | 8/1960 | Petersen | 254/134.3 R |
| 3,073,574 | 1/1963 | Garnett | 242/86.5 R |
| 3,313,525 | 4/1967 | Vanderbeck | 254/284 |
| 3,504,866 | 4/1970 | Palynchuk et al. | 242/86.5 |
| 3,934,854 | 1/1976 | Goode | 254/134.3 R |
| 4,109,810 | 8/1978 | Jones | 254/281 X |
| 4,234,167 | 11/1980 | Lane | 254/291 |
| 4,438,904 | 3/1984 | White | 254/311 |
| 4,513,952 | 4/1985 | Vandelinde | 254/294 X |
| 4,635,875 | 1/1987 | Apple | 254/155 BW |
| 4,666,102 | 5/1987 | Colbaugh et al. | 254/134.3 R X |
| 4,666,128 | 5/1987 | Bechmann | 254/329 |

*Primary Examiner*—Daniel P. Stodola
*Assistant Examiner*—John Rollins
*Attorney, Agent, or Firm*—Leydig, Voit & Mayer

[57] ABSTRACT

A method and apparatus for pulling cables has a subassembly including a cooperatively driven line pulling take-up spool and level winding device. The subassembly is utilized in combination with a capstan with the take-up spool, level winding device and capstan driven jointly by the same drive. The drive is coupled to a drive shaft upon which the take-up spool is mounted. The take-up spool drive shaft in turn is coupled separately to both a level winding device drive shaft and a capstan drive shaft to provide the cooperative drive. The assembly is mounted on a tiltable table which permits pulling from various angles.

22 Claims, 6 Drawing Sheets

WINDING DEVICE HAVING A TILTING TABLE AND METHOD

This is a continuation-in-part of copending application Ser. No. 07/648,041 filed on Jan. 30, 1991, now abandoned.

FIELD OF THE INVENTION

The present invention relates generally to pulling cables such as electrical wires or conductors, and more particularly is directed to a method and apparatus for level winding the cable pulling line around a take-up spool.

BACKGROUND OF THE INVENTION

In electrical wire or cable stringing applications, such as situations where wire is pulled through conduit by a cable or line at a desired and controlled rate, there is a need for the pulling cable line to be supported under tension by use of some form of a cable support device such as a drum or spool. In cable laying operations the heavy electrical or mechanical cable to be pulled under tension through support conduits or over utility poles, is in conventional practice hooked up to some kind of "fish wire" or "pulling line" attached to the leading end of the cable and then the pulling line pulls the heavy cable through the conduit or over the poles until it is in the desired position. The pulling action is generally accomplished through a cable support drum or capstan which is rotatable.

The drum provides an anchoring surface on which the pulling line may be wound so as to utilize the rotational motion of the drum toward imparting pulling action on the cable. Under such conditions, forces are generated which accumulate and tend to collapse the drum or spool onto which the pulling line is being wound. Such collapsing generally occurs as a result of the cumulative effects of tension generated during the pulling action. One such effect is the direct result of the cable being under tension while it is actually being pulled by the pulling line. Another affecting factor is the force existing due to the weight of the cable itself, which can amount to a significant value depending upon the particular cable winding application. The weight of the cable adds considerably to the operating tension particularly when the pulling line is utilized for lifting heavy cable through large distances in vertical conduits or poles, against gravitational forces. Another source of increased pulling force is that there is an angle between the cable and the capstan so that the total force exerted on this cable has to be greater in order to provide a sufficient force component in a direction parallel to the capstan.

Since the surface of the drum onto which the pulling line is wound is the effective fulcrum of support, it is subjected to all the accumulated forces resulting from the tension generated as the pulling line is progressively wound or unwound around the support drum. Such accumulated forces of tension tend to collapse the drum or spool during the cable pulling operation. This collapsing effect of the tensioning forces is compounded when the cable pulling operation requires intermittent "pulling" and "braking" actions of the pulling line, which frequently is the case. In the past, this problem has been solved, among other ways, by the use of winding drums or spools made of heavy duty material capable of withstanding the compressive forces generated during high tension winding.

One solution to this problem is provided by Applicant's prior take-up system disclosed in U.S. Pat. No. 4,657,202. A reel assembly for playing out the cable is disclosed in Applicant's U.S. Pat. No. 4,325,522. Heavy duty capstans also have been utilized, but then the cable pulling line generally merely is played out onto the ground for later rewinding.

It would be desirable to provide a take-up spool which can be utilized in conjunction with a capstan, which take-up spool does not need to withstand the high forces transmitted to the capstan, and which will level wind the cable pulling line around the take-up spool for reuse.

It would further be desirable to allow the winding assembly to be movable so as to reduce or eliminate large angular differances between the capstan position and the approach of cable being reeled in.

OBJECTS AND SUMMARY OF THE INVENTION

It is, therefore, a primary object of the present invention to provide a level winding take-up spool for pulling cables.

A further object of the present invention is to provide a take-up spool which operates in conjunction with a capstan.

It is yet another object of the present invention to provide a single drive for the take-up spool, level winding device and capstan.

It is still another object of the present invention to allow motion of the take-up spool and capstan in order to reduce or eliminate the angular approach between the capstan and the cable being reeled in.

In general, the present invention contemplates a cable line pulling take-up spool and level winding device subassembly which are driven together. The subassembly is utilized in conjunction with a capstan with the take-up spool, level winding device and capstan driven by a single motor. The motor drives a take-up spool drive shaft upon which the spool is mounted. The take-up spool drive shaft is coupled both to a level winding drive shaft and to a capstan drive shaft to provide a cooperative drive for the apparatus. The take-up spool and capstan are mounted on a table. One part of the table is attached to a frame by hinges which allow the table to be pivoted in respect to the frame. The table is attached on its underside to a hydraulic lifting device to allow tilting of the table. The table, along with the take-up spool and capstan, can be mounted on a cable pulling mobile trailer.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Figure 1A:
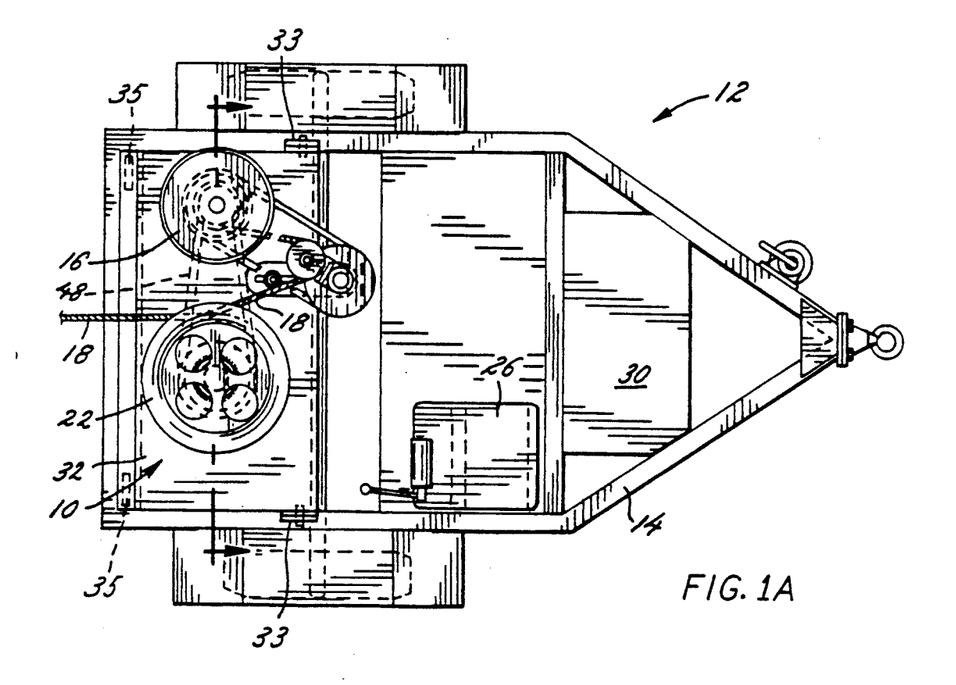
FIGS. 1A and 1B respectively are a top and side view of the cable pulling apparatus of the present invention mounted on a trailer.
Figure 1B:
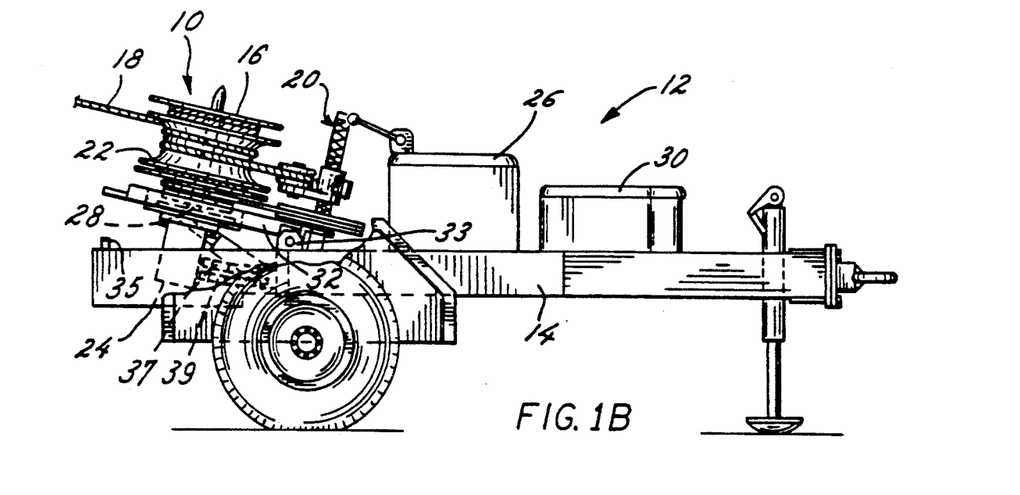

Turning to the drawings, there is shown in FIGS. 1A and 1B a cable pulling apparatus of the present invention generally indicated by the reference numeral 10. The cable pulling apparatus 10 is mounted, for example, onto a mobile cable trailer 12. The cable trailer 12 includes a base or frame 14 upon which the cable pulling apparatus 10 is mounted.

The cable pulling apparatus 10 includes three main elements, a take-up spool 16 upon which a cable, or more often a pulling line 18 (and hereafter described as a pulling line for example purposes) is wound. The pulling line 18 is level wound onto the take-up spool 16 by a level winding device 20. The pulling line 18 is pulled by a capstan 22.

Power is supplied to the cable pulling apparatus 10 by a drive motor 24, also mounted to the base 14. The drive motor 24, such as an Eaton Series 2000 two speed hydraulic motor is driven by a power unit 26. The drive motor 24, preferably directly drives a drive shaft 28 of the take-up spool 16, as is best illustrated with respect to FIGS. 2 and 3. The cable trailer 12 has a storage area 30 which can accommodate a plurality of take-up spools 16 for the pulling lines 18. The cable trailer 12 also can include other auxiliary equipment which can be utilized in the cable pulling operations.

Figure 2:
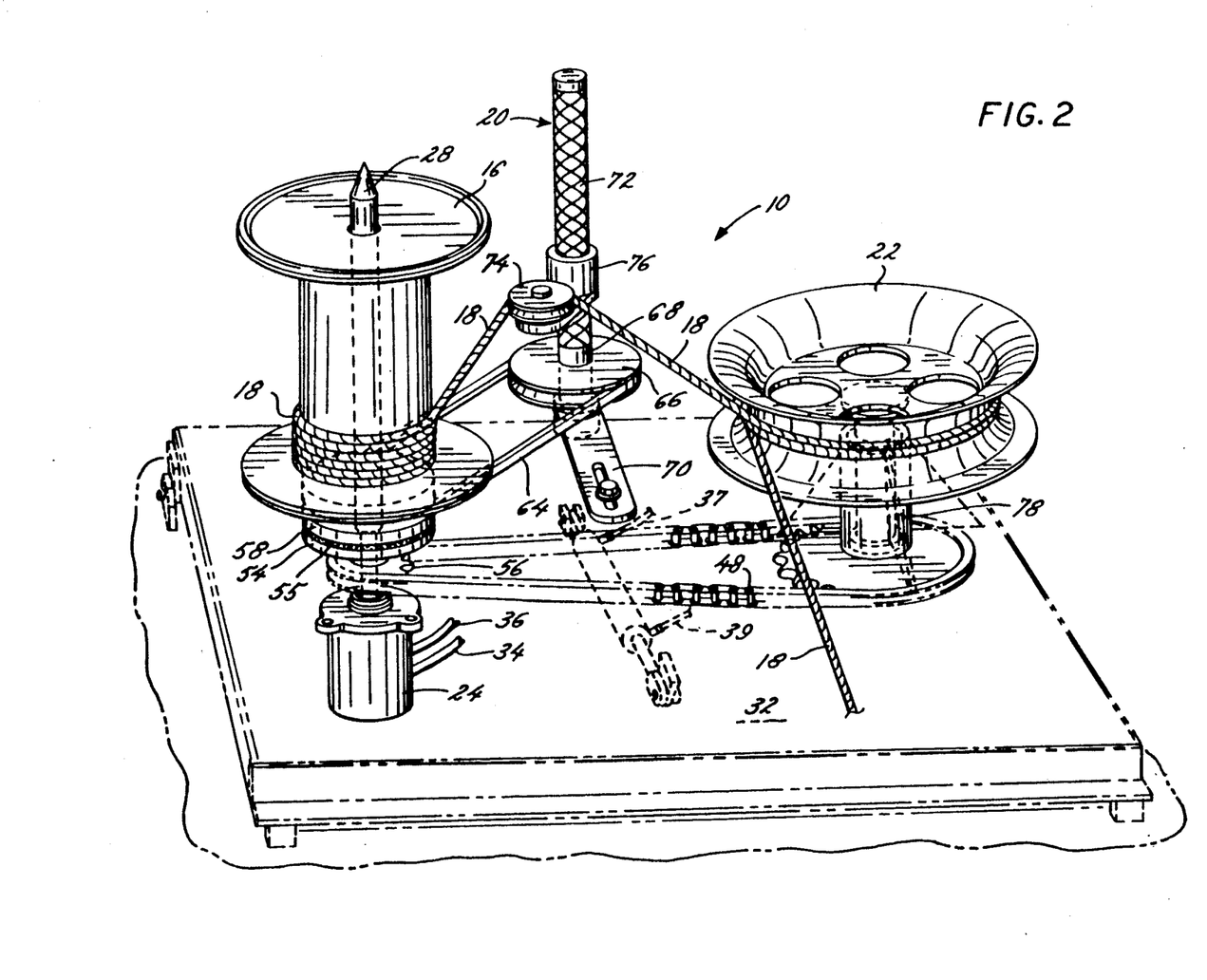
FIG. 2 is a perspective view of the cable pulling apparatus of the present invention.
Figure 3:
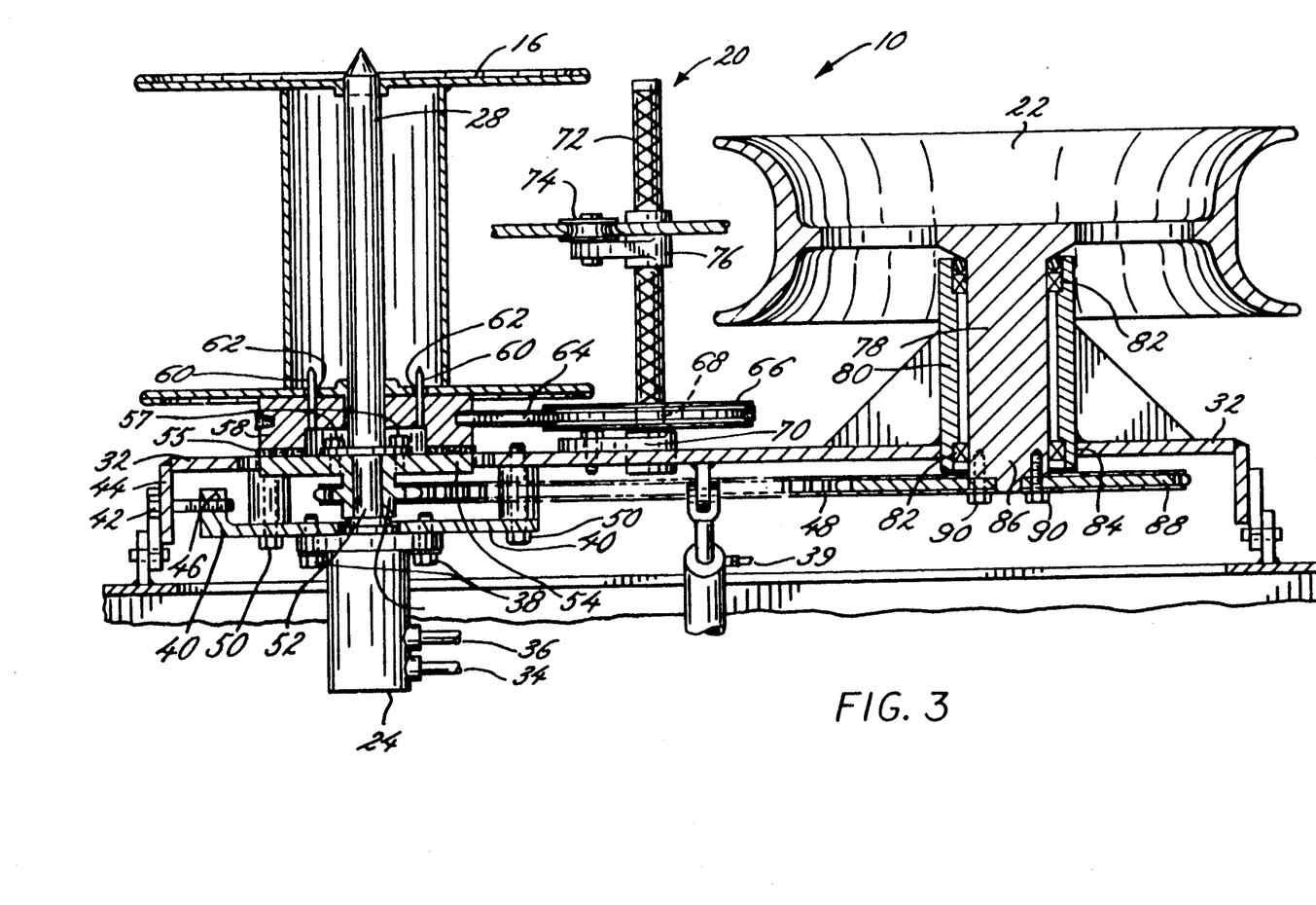
FIG. 3 is a side partial sectional view of the cable pulling apparatus of the present invention.

Referring now to FIGS. 2 and 3, the details of the cable pulling apparatus 10 are best illustrated. The cable pulling apparatus 10 is mounted onto a tilt table 32, which in turn is mounted onto any convenient base frame, such as the trailer frame 14.

The drive motor 24 is driven by a pair of hydraulic lines 34, 36 supplied by a power unit, such as the unit 26.

The drive motor 24 is mounted by a plurality of bolts 38 to a laterally adjustable support plate 40. The support plate 40 is laterally adjustable by a chain tightening bolt 42 mounted through a fixed side wall 44 of the frame 32. The bolt 42 is threaded through a nut 46 mounted on the support plate 40. The bolt 42 and hence the support plate 40 are adjusted to provide the proper tension to a drive chain line 48 coupling the take-up spool 16 and the capstan 22, as described thereinafter. Once the proper tension is applied, the support plate 40 is secured to the frame 32 by a plurality of bolts 50.

The drive motor 24 includes a drive shaft 52 which is mounted to a sprocket plate 54. The sprocket plate 54 carries a resilient friction member 55 that can be made of rubber or the like. A drive sprocket 56 is provided for the drive chain 48. The drive shaft 28, which also functions as a take up spindle for the take-up spool 16, is mounted to the sprocket plate 54 by a plurality of bolts 56.

The sprocket plate 54 and friction member 55 provide a friction drive to pulley 58 mounted around the drive shaft 28 with the lower face of the pulley 58 resting on the friction member 55. The pulley 58 includes one or more drive pins 60, which are accommodated through apertures 62 in the take-up spool 16 to drive the take-up spool 16. The pulley 58 has a level winding device drive belt 64 mounted at one end onto the pulley 58. The opposite end of the drive belt 64 is mounted around a level winding device drive pulley 66.

The drive pulley 66 is mounted onto a drive shaft 68 of the level winding device 20. The drive shaft 68 is adjustably mounted to the frame 32 by an adjustable arm 70. The arm 70 and hence the drive shaft 68 are adjusted to provide the proper tension for the drive belt 64. The drive shaft 68 forms part of or is connected to a level wind screw 72, which has a pulling line pulley 74 mounted thereon by a screw follower 76. The screw follower 76 in conjunction with the rotating level wind screw 72, drives the pulley 74 reversibly up and down the level wind screw 72 to level wind the pulling line 18 on the take-up spool 16.

The capstan 22 includes a drive shaft 78 rotatably mounted into a fixed hollow shaft 80 by a plurality of bearings 82. The hollow shaft 80 is mounted in an aperture 84 of the frame 32. A bottom portion 86 of the drive shaft 78 extends beyond the hollow shaft 80 and has a drive sprocket 88 mounted thereto by a plurality of bolts 90. The cable pulling apparatus 10 as described has one drive source 24, driving all three of the take-up spool 16, the level winding device 20 and the capstan 22 together. The capstan 22 withstands the pulling forces exerted by the pulling line 18 and cable attached thereto, while being driven by the take-up spool drive shaft 28. The line 18 is level wound onto the take-up spool 16 by the level winding device 20, also driven by the take-up spool drive pulley 58.

It will be appreciated that with the friction drive arrangement, pulley 58 and spool 16 turn as line is available coming off the capstan 22. As the line 18 is wound on the spool 16, the rotational speed of the spool slows down and likewise because of the pulley 58 direct drive to the level winder, it correspondingly slows down. When no further line is available to the spool, it will stop by full slippage taking place with respect to the spool and friction member 55. Hence, there is always a perfect winding of the line 18 onto spool 16 due to the corresponding of speeds at which the spool rotates and the level winding device advances up and down as positioned in FIG. 3. It will be noted, for example, that when line 18 is initially starting to be wound on the spool as made available from the capstan 22, the winding diameter on the spool is relatively small and a faster spool rotation occurs to accomplish winding, but as layers are added a slower spool rotation occurs to accommodate the increasing winding diameters. It should also be appreciated that the take-up spool 16 and the level winding device 20 form a subassembly which can be separately supplied to be assembled with an existing capstan 22 to form the cable pulling apparatus 10. It will be appreciated that while a single or common drive motor 24 is employed for the spool, level winder and capstan, the capstan can alternatively be driven cooperatively by a separate electric motor or the like.

Figure 4A:
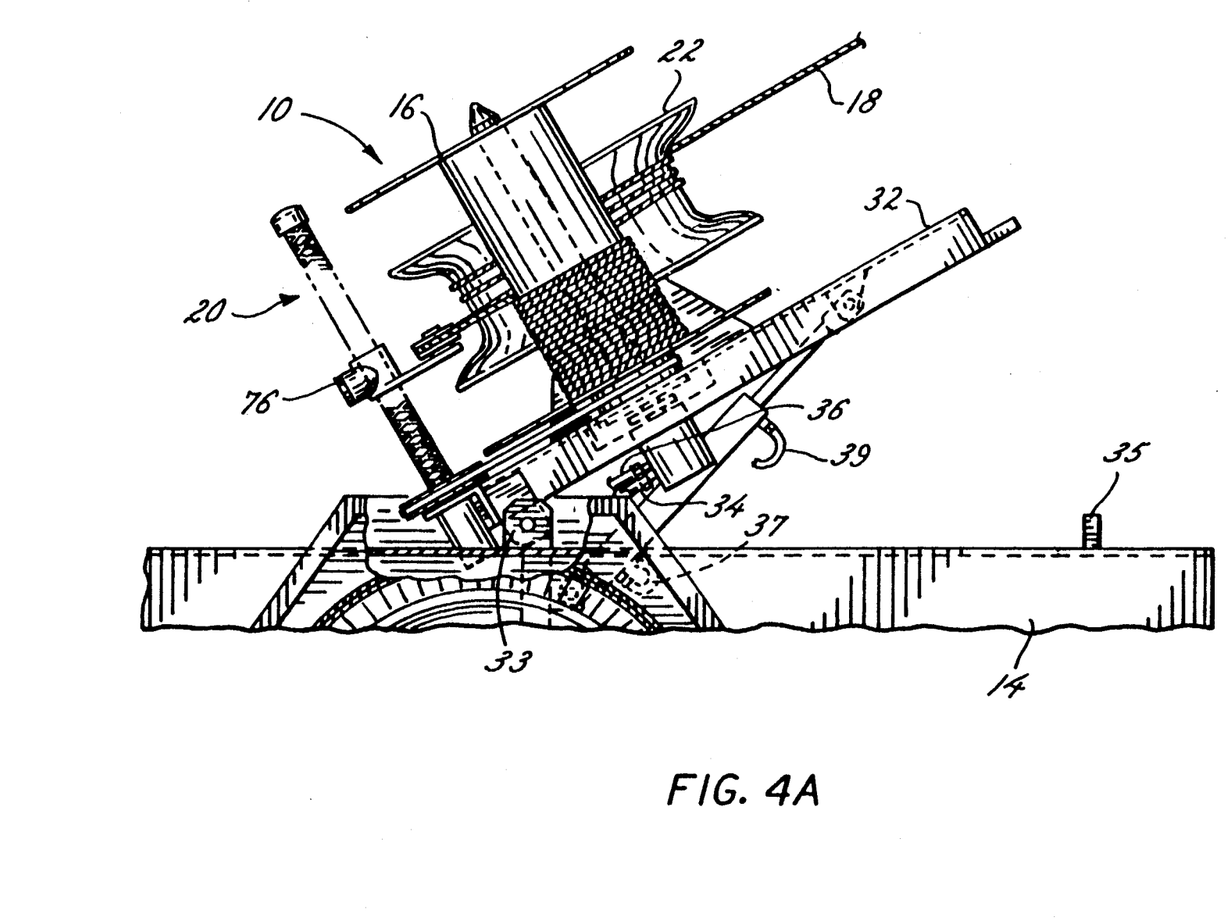
FIGS. 4A and 4B are side views showing the tilt table and apparatus in a raised and lowered position, respectively, and also illustrating the ranges of motion of the pulling apparatus.
Figure 4B:
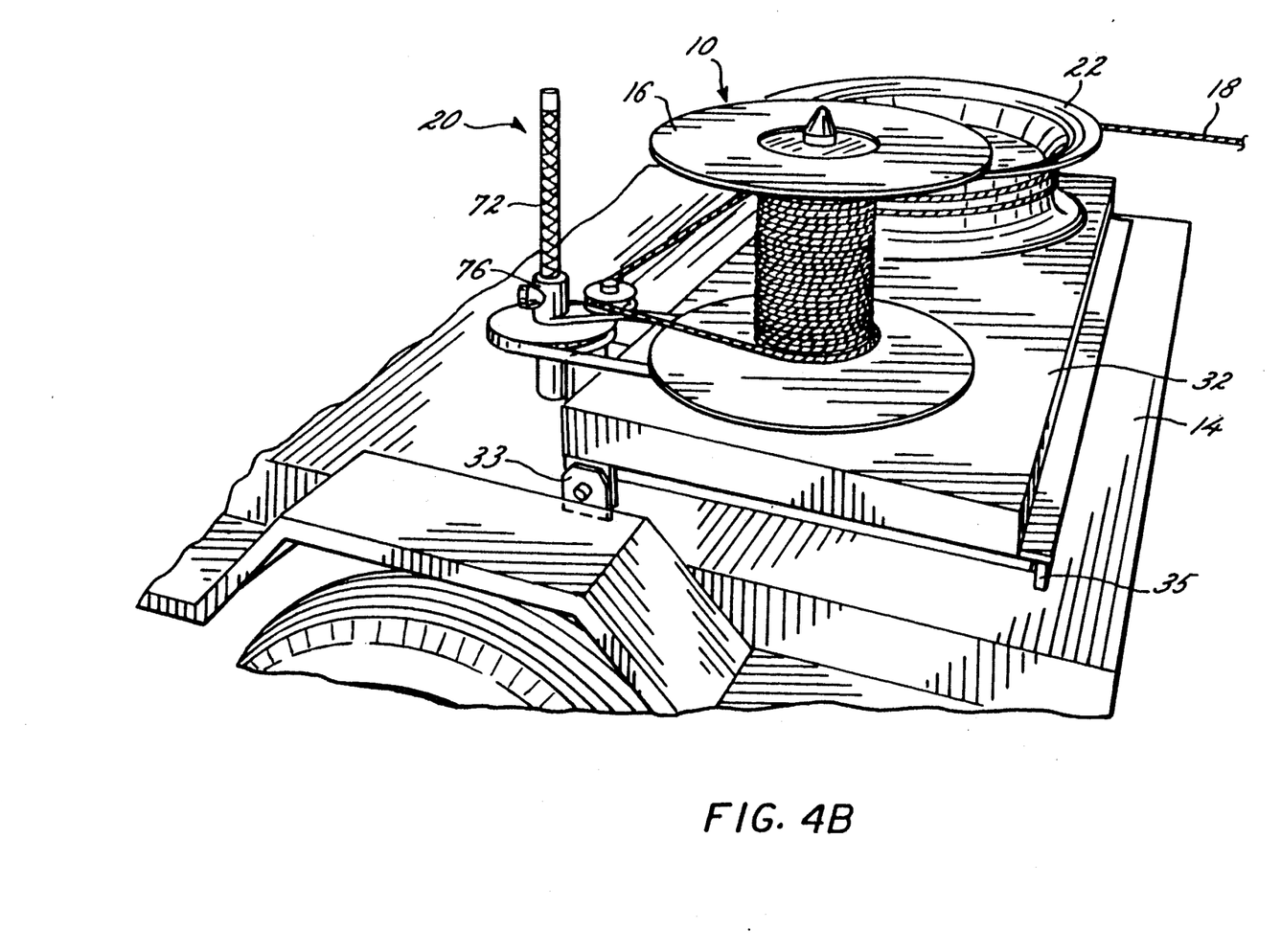

FIG. 4A shows the pulling apparatus 10 mounted onto the tilt table 32, which is in turn mounted onto the trailer frame 14. One end of the tilt table 32 is attached to the trailer frame 14 by pin type hinges 33 at opposite sides of one end. The other end of the tilt table 32 rests on blocks 35 attached to the frame 14. FIG. 4A shows the tilt table 32 in a raised position, where it can be seen that the tilt table 32 is attached on its underside to a hydraulic lifting device 37. The hydraulic lifting device 37 is driven by a pair of hydraulic lines 39 supplied by a power unit, such as the unit 26. The lifting device allows the tilt table to be raised and lowered at the discretion of the operator. This arrangement allows the operator to vary the pulling angle as may be desired according to particular cable stringing situations. The vertical raising of the tilt table provides for corresponding settings in the vertical axis as shown in FIG. 4A, while horizontal angularity is illustrated in FIG. 4B with the table in the lowered position.

Figure 5:
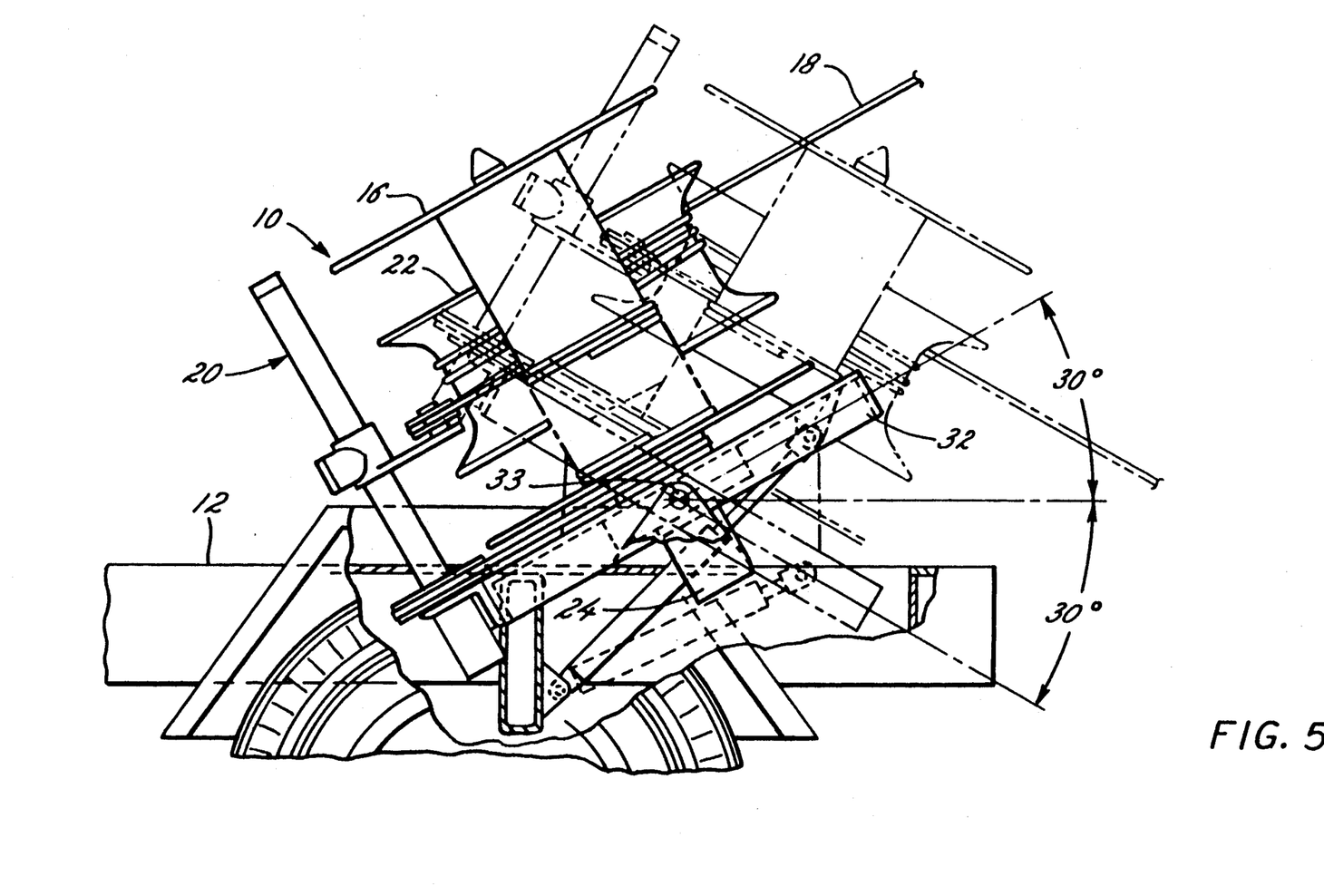
FIG. 5 is a side view of an alternative embodiment where the table is pivoted at its center to allow downward tilting from the horizontal position.

Referring to FIG. 5, there is shown an alternative form, where the tilt table 32 is hinged along its sides at the approximate center by pin hinges 33 and can be tilted downwardly as well as upwardly when viewed from the rear or left of FIG. 5. This arrangement allows the pulling apparatus 10 to be used for pulling underground cable such as from a manhole. Preferably, the tilt table 32 is permitted to angle the capstan 22 centerline up or down 30° from the horizontal.

I claim as my invention:

1. A subassembly for pulling cables via a pulling line, comprising:
   take-up spool means including a spool for winding the pulling line therearound;
   means for level winding said pulling line around said spool;
   means for driving said take-up spool means;
   a driving mechanism for driving said level-winding means cooperatively with said take-up spool means; and
   means for simultaneously tilting said take-up spool means, said level winding means, and said driving means, to allow pulling of said cable from various angles relative to a horizontal disposition of said take-up spool means.

2. The subassembly of claim 1 wherein said tilting means include a table having at least one degree of freedom.

3. The subassembly of claim 2 wherein said table is attached to a hydraulic lifting device.

4. The subassembly of claim 3 including said spool mounted through a frictional coupling to a drive shaft and said driving means include a motor coupled to said drive shaft to rotate said drive shaft.

5. The subassembly of claim 4 including said level winding means mounted on a shaft and said spool drive shaft coupled to said level winding means drive shaft to drive said level winding means.

6. The subassembly of claim 5 wherein said spool drive shaft and said level winding means include drive pulleys mounted thereto and a drive belt mounted between said pulleys for driving said level winding means drive shaft.

7. The subassembly of claim 6 wherein said level winding means include level winding screw means and a level winding pulley reversibly drivable thereon through which said cable or pulling line is passed.

8. An apparatus for pulling cables via a pulling line, comprising:
   capstan means for pulling the pulling line and feeding said pulling line to take-up spool means;
   said take-up spool means including a spool for winding the pulling line therearound;
   means for level winding said pulling line around said spool;
   means for driving said take-up spool means;
   means for driving said level-winding means from said take-up spool means; and means for driving said capstan means cooperatively with said take-up spool means; and
   means for simultaneously tilting the take-up spool means, the level winding means, the capstan means, and the driving means to allow pulling from various angles relative to the horizontal disposition of the capstan.

9. The apparatus of claim 8 including said spool mounted on frictional coupling means for coupling said spool to a drive shaft and said take-up spool driving means including a motor coupled to said drive shaft to rotate said drive shaft.

10. The apparatus of claim 9 including said level winding means mounted on a drive shaft and said spool drive shaft coupled to said level winding means drive shaft to drive said level winding means.

11. The apparatus of claim 10 wherein said spool drive shaft and said level winding means include drive pulleys mounted thereto and a drive belt mounted between said pulleys for driving said level winding means drive shaft.

12. The apparatus of claim 10 wherein said level winding means include level winding screw means for driving a level winding pulley and said level winding pulley reversibly drivable thereon through which said cable or pulling line is passed.

13. The apparatus of claim 10 including said capstan means mounted on a drive shaft and said spool drive shaft coupled thereto to drive said capstan means with said take-up spool means.

14. The apparatus of claim 13 wherein said spool drive shaft and said capstan drive shaft include drive sprockets mounted thereto and a chain link drive mounted between said sprockets for driving said capstan drive shaft.

15. The apparatus of claim 14 including each drive shaft mounted onto a cable trailer.

16. An apparatus for pulling cables via a pulling line, comprising:
   capstan means for pulling the pulling line and feeding said pulling line to take-up spool means;
   said take-up spool means including a spool for winding the pulling line therearound;
   means for level winding said pulling line around said spool;
   means for driving said take-up spool means;
   means for driving said level-winding means from said take-up spool means;
   means for driving said capstan means cooperatively with said take-up spool means;
   said spool being mounted through frictional coupling means for coupling said spool to a drive shaft and said take-up spool driving means including a motor coupled to said drive shaft to rotate said drive shaft;
   said level winding means being mounted on a drive shaft and said spool drive shaft being coupled to said level winding means drive shaft to drive said level winding means;
   said level winding means include level winding screw means for driving a level winding pulley and said level winding pulley reversibly drivable thereon through which said pulling line is passed;
   said capstan means mounted on a drive shaft and said spool drive shaft coupled thereto to drive said capstan means; and means for simultaneously tilting said take-up spool means, said capstan means, and said level winding means to allow pulling from various angles relative to a horizontal disposition of the capstan.

17. The apparatus of claim 16 wherein said spool drive shaft and said level winding means include drive pulleys mounted thereto and a drive belt mounted between said pulleys for driving said level winding means drive shaft; and said spool drive shaft and said capstan drive shaft include drive sprockets mounted thereto and a chain link drive mounted between said sprockets for driving said capstan drive shaft.

18. A method of pulling a pulling line attached to a cable by way of a capstan, level winding device and take-up spool respective ones of which are carried on a base surface means, said method comprising:

pulling said pulling line attached to said cable first around said capstan;

winding said pulling line from said capstan around the take-up spool via the level winding device;

driving said take-up spool;

driving said level winding device from said take-up spool in a manner so as to level wind the pulling line on the spool;

driving said capstan cooperatively with said take-up spool; and pivoting said base surface means carrying said take-up spool, said capstan and level winding device from a horizontal position to a relative angular position for pulling from various angles relative to the horizontal position.

19. The method of claim 18 wherein said driving said take-up spool comprises: driving a rotatable shaft driven by a motor coupled to said rotatable shaft, and coupling said rotatable shaft to said take-up spool by means of a frictional coupling.

20. The method of claim 19 wherein said driving said capstan cooperatively with said take-up spool comprises: coupling said rotatable shaft to a shaft on which the capstan is mounted by means of drive sprockets, and driving said rotatable shaft.

21. The method of claim 19 wherein said driving said level winding device from said take-up spool comprises: coupling said rotatable shaft to another shaft on which said level winding device is mounted by means of a set of drive pulleys, and driving said rotatable shaft.

22. The method of claim 18 wherein said pivoting of said base surface means comprises: providing a tilting table pivotally mounted on a wheeled trailer, and pivoting said tilting table with respect to said trailer.

* * * * *